(12) United States Patent
Okude et al.

(10) Patent No.: US 8,483,950 B2
(45) Date of Patent: Jul. 9, 2013

(54) ROUTE GUIDANCE SERVER, NAVIGATION APPARATUS, ROUTE GUIDANCE SYSTEM, AND ROUTE GUIDANCE METHOD

(75) Inventors: Mariko Okude, Hitachi (JP); Michihito Mizuno, Ebina (JP); Hirofumi Komine, Yokosuka (JP); Kenji Suzuki, Tokyo (JP); Shinichi Amaya, Higashiyamato (JP); Yuji Oohara, Saitama (JP)

(73) Assignees: Hitachi Automotive Systems, Ltd., Hitachinaka-shi (JP); Clarion Co., Ltd., Tokyo (JP)

( * ) Notice: Subject to any disclaimer, the term of this patent is extended or adjusted under 35 U.S.C. 154(b) by 358 days.

(21) Appl. No.: 12/826,361

(22) Filed: Jun. 29, 2010

(65) Prior Publication Data

US 2010/0332132 A1 Dec. 30, 2010

(30) Foreign Application Priority Data

Jun. 30, 2009 (JP) ................. 2009-155624

(51) Int. Cl.
*G01C 21/26* (2006.01)

(52) U.S. Cl.
USPC ............................ 701/411; 701/414; 701/533

(58) Field of Classification Search
USPC ............................ 701/411, 414, 423, 532–534
See application file for complete search history.

(56) References Cited

U.S. PATENT DOCUMENTS

| | | | |
|---|---|---|---|
| 5,638,280 A * | 6/1997 | Nishimura et al. | 701/418 |
| 6,662,101 B2 * | 12/2003 | Adachi | 701/420 |
| 6,687,611 B1 | 2/2004 | Hessing et al. | |
| 6,728,631 B1 | 4/2004 | Hessing | |
| 7,065,447 B2 * | 6/2006 | Shimizu et al. | 701/414 |
| 7,333,666 B2 * | 2/2008 | Adachi | 382/243 |
| 7,526,377 B2 * | 4/2009 | Wiener et al. | 701/414 |
| 8,255,162 B2 * | 8/2012 | Okude et al. | 701/533 |
| 2003/0154019 A1 | 8/2003 | Adachi et al. | |
| 2007/0005238 A1 * | 1/2007 | Adachi | 701/209 |
| 2008/0154489 A1 * | 6/2008 | Kaneda et al. | 701/201 |
| 2010/0332121 A1 * | 12/2010 | Okude et al. | 701/201 |
| 2012/0143886 A1 * | 6/2012 | Okude et al. | 707/756 |

FOREIGN PATENT DOCUMENTS

| | | |
|---|---|---|
| EP | 1 273 883 A1 | 1/2003 |
| EP | 1 340 962 A2 | 9/2003 |
| JP | 2002-228468 | 8/2002 |

OTHER PUBLICATIONS

European Search Report dated Nov. 16, 2010 (ten (10) pages).

* cited by examiner

*Primary Examiner* — Joseph C Rodriguez
(74) *Attorney, Agent, or Firm* — Crowell & Moring LLP

(57) ABSTRACT

A position coordinate based route transmitted from a server is reconstructed as a route of link numbers or node numbers in map data of navigation apparatus without error. A route guidance server searches a route from a start point to end point designated by a navigation apparatus; selects all or a part of nodes included in the searched route as route nodes; sets complementary points to the respective selected route nodes on the route and at a distance longer than a predetermined distance from the respective route nodes; and transmits information including coordinate information on the route nodes and complementary points as route information to the navigation apparatus. Then, based on the coordinate information on the route nodes and complementary points transmitted from the server, the navigation apparatus identifies the route nodes and road links connecting the route nodes by identification numbers in map data the navigation apparatus it self has.

6 Claims, 13 Drawing Sheets

FIG.6

(route point information)

| number of route nodes n | |
|---|---|
| route node #1 coordinate | X coordinate value #1 (latitude) |
| | Y coordinate value #1 (longitude) |
| route node #2 coordinate | X coordinate value #2 (latitude) |
| | Y coordinate value #2 (longitude) |
| ~ | ~ |
| route node #n coordinate | ~ |
| complementary point #1 coordinate | X coordinate value #1 (latitude) |
| | Y coordinate value #1 (longitude) |
| complementary point #2 coordinate | X coordinate value #2 (latitude) |
| | Y coordinate value #2 (longitude) |
| ~ | ~ |
| complementary point #n coordinate | ~ |
| attribute information #1 | route node #1 type |
| | route node #1 intersection name |
| | branch direction $\theta$ to complementary point #1 |
| | road type of road from route node #1 toward complementary point #1 |
| | link type of road from route node #1 toward complementary point #1 |
| | distance to next route node #2 |
| ~ | ~ |
| attribute information #n | ~ |

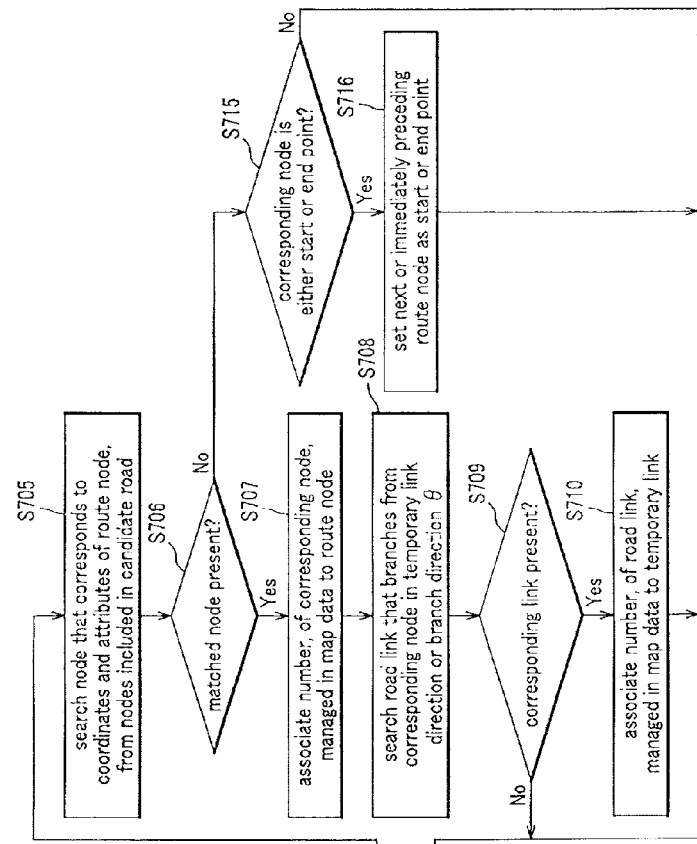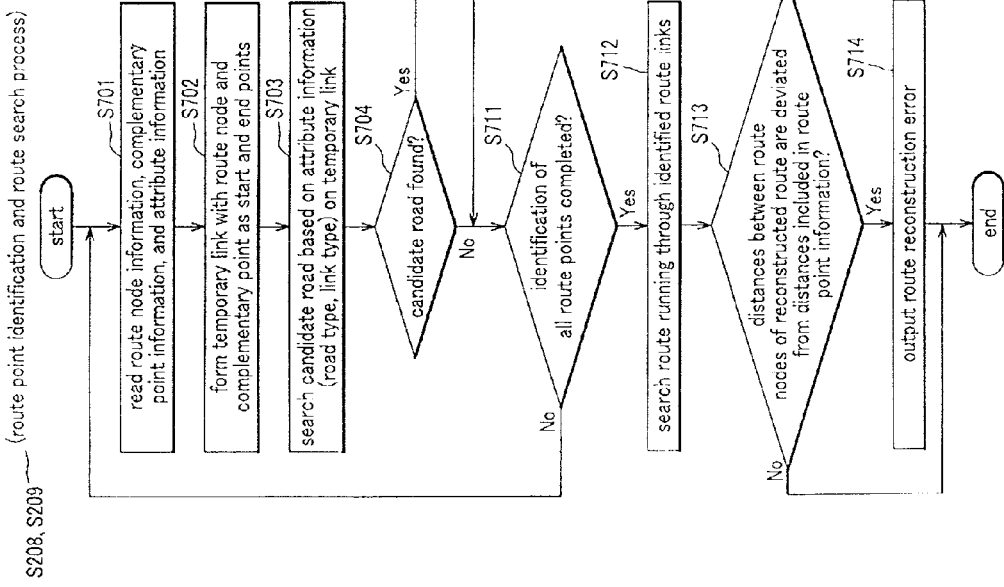
FIG. 7

ROUTE GUIDANCE SERVER, NAVIGATION APPARATUS, ROUTE GUIDANCE SYSTEM, AND ROUTE GUIDANCE METHOD

CROSS REFERENCE TO RELATED APPLICATION

The application claims the foreign priority benefit under Title 35, United States Code, §119(a)-(d) of Japanese Patent Application No. 2009-155624, filed on Jun. 30, 2009, the contents of which are hereby incorporated by reference.

BACKGROUND OF THE INVENTION

1. Field of the Invention

The present invention relates to a route guidance server, navigation apparatus, route guidance system, and route guidance method that are suitable for route guidance of a vehicle.

2. Description of the Related Art

In recent years, navigation apparatuses (hereinafter referred to as navigation apparatuses) are significantly spread, wherein the car navigation apparatuses receive latest information, such as the crowded state of a road, transmitted from various information centers via broadcast or communication devices, and provide the driver of a vehicle with an appropriate route guidance to a destination, taking into account the received latest information.

For example, functions to receive latest traffic information, such as information on a traffic congestion or travel time, provided from a traffic information center via FM multiplex broadcast or the like, to calculate a route with a minimum time to a destination, taking the traffic information into account, and to display the route to the destination on a display, can be said to have been established as basic functions of a navigation apparatus. Today, such a navigation apparatus has been developed that obtains predicted traffic information on the estimated passing time of the vehicle so that the arrival time can be predicted with higher accuracy for a route that allows earlier arrival at the destination. Then, the navigation apparatus uses the obtained predicted traffic information to calculate an optimum route to the destination. Further, navigation apparatuses have been also commercialized that obtain an optimum route calculated by an information center, reflecting latest traffic information, and provide a route guide to a destination.

Further, not limited to traffic information, there is a movement for improvement of navigation service, taking huge and latest information, which external various sites (information centers) have, into a terminal. For example, portal sites that support travel planning at home provide information including route information to a destination, departure time, and POI like resting spots, wherein latest information, such as facility and road usage charges, facility usage status, event information, which dynamically change, are taken into account. There are also services which transfer travel information planned by such a portal site to a navigation apparatus through communication or mobile storage medium, and make the information usable for guided guidance of a route to the destination on the navigation apparatus.

Incidentally, as methods of expressing route information to a destination, there are two methods as follows.

(a) A method that uses the link numbers of road links or node numbers of nodes (which are ordinarily intersections) being connection points of the road links used in map data, and thereby expresses a route as a series of the plural link numbers or node numbers included in the route.

(b) A method that expresses a route by a sequence of points and expresses the route as a series of position coordinates such as the longitudes and latitudes of the respective points.

Method (a) is desirable for correctly reconstructing route information, given by an information center, on a navigation apparatus. However, if the navigation apparatus is produced by a different manufacturer, the format of map data is different, or the map version is different even with the same map data format, it is not always that the same road link numbers are given for the same road. Consequently, when the information center provides route information to the navigation apparatus, Method (a) will cause a problem of lacking in compatibility of road link numbers therebetween.

In contrast, by Method (b), the route information is expressed by coordinate information on latitudes and longitudes of the respective points of a sequence of points representing a route, and accordingly the problem of compatibility of the format of map data and road link numbers is not caused. However, by this method, map data are different between the information center and the navigation apparatus, and further, in a case, for example, where there are roads going close and parallel to the route or roads branching from the route, coordinate positions designated by the information center sometimes cannot be correctly related to road positions of the map data on the navigation apparatus due to the errors between the coordinate information on the longitudes and latitudes of road positions expressed in the map data of the information center and the coordinate information on the latitudes and longitudes of road positions expressed in the map data of the navigation apparatus. That is, Method (b) has a problem that route information transmitted by the information center cannot always be correctly reconstructed by the navigation apparatus.

Further, in the case of Method (b), because route information is expressed by the data of a sequence of many points expressed by coordinate information on latitudes and longitudes, a problem will be caused that the information amount becomes large. When the information amount of route information transmitted from the information center to the navigation apparatus becomes large, the communication load of the communication path will be increased for it as well as the communication cost.

In this situation, as a method of reducing an information amount in such communication, the coordinate information on shape points of a route is often reduced or a road shape is often approximated by a line or curve, and Patent Document 1, namely, Japanese Patent Laid-Open No. 2002-228468 discloses an example of such a case.

According to Patent Document 1, an information center transmits node information on nodes (coordinate information+attribute information, etc. of nodes) which are intermittently selected from node information on nodes included in route information to be transmitted. Based on the node information (coordinate information) on the nodes intermittently selected, a navigation apparatus determines the node numbers, on the map of the navigation apparatus, of the nodes selected intermittently, by map-matching. Then, the navigation apparatus seeks the node numbers of the nodes whose node numbers have been determined, in other words, the node numbers of nodes included in a route connecting the nodes selected above, in other words, the node numbers of the nodes in a fewer number, by route search. Thus, the navigation apparatus reconstructs the route designated by the information center.

Further, according to Patent Document 1, it is judged that mere map-matching of node position coordinates cannot avoid occurrence of errors, and matching of attribute information is also performed such that, not only coordinate information on nodes, but also attribute information (shape information and the like) on the nodes and attribute information on the incoming links/outgoing links at the nodes, are included in node information transmitted from the information center.

SUMMARY OF THE INVENTION

However, in the surrounding of nodes where plural roads intersect, particularly roads in urban areas, plural nodes are often present adjacent to each other, and the attribute information accompanying these nodes are often the same or similar. Accordingly, a matching process only with coordinate information and attribute information on nodes, such as disclosed by Patent Document 1, still has a problem that route information transmitted from an information center may not be reconstructed into a correct route due to incorrect map matching of nodes.

In this situation, an object of the present invention is to provide a route guidance server, navigation apparatus, route guidance system, and route guidance method that enable the navigation apparatus to reconstruct a route expressed on the basis of position-coordinates transmitted from an information center (a route guidance server) into a route represented by link-numbers or node-numbers which are based on the map data of the navigation apparatus itself without an error even when the map data of the information center and the map data of the navigation apparatus are different from each other.
Means for Solving the Problem In a route guidance system in accordance with the invention, based on route search request information including information on a start point and end point transmitted from a navigation apparatus, a route guidance server searches a route from the start point to the end point; selects all or a part of nodes included in the searched route as route nodes; sets complementary points to the respective selected route nodes on the route and at a distance longer than a predetermined distance from the respective route nodes; and transmits information including coordinate information on the route nodes and coordinate information on the complementary points as route information to the navigation apparatus. Then, based on the received coordinate information on the route nodes and coordinate information on the complementary points, the navigation apparatus identifies the route nodes and road links connecting the route nodes by identification numbers in map data the navigation apparatus it self has.

Consequently, in accordance with the invention, a navigation apparatus can obtain, not only coordinate information on route nodes, but also coordinate information on complementary points for easy determination of the route nodes. Accordingly, the navigation apparatus can easily identify route nodes included in route information transmitted from a route guidance server with nodes in map data of the navigation apparatus itself.

BRIEF DESCRIPTION OF THE DRAWINGS

FIG. 6 is a diagram showing an example of the data format of route point information provided from the server to the navigation apparatus in the embodiment in accordance with the invention;

FIG. 7 is a diagram showing an example of a processing flow of identification processing of route points and route searching processing (steps S208 and S209 in FIG. 2) on the navigation apparatus in the embodiment in accordance with the invention;

DETAILED DESCRIPTION OF THE PREFERRED EMBODIMENT

Figure 1:
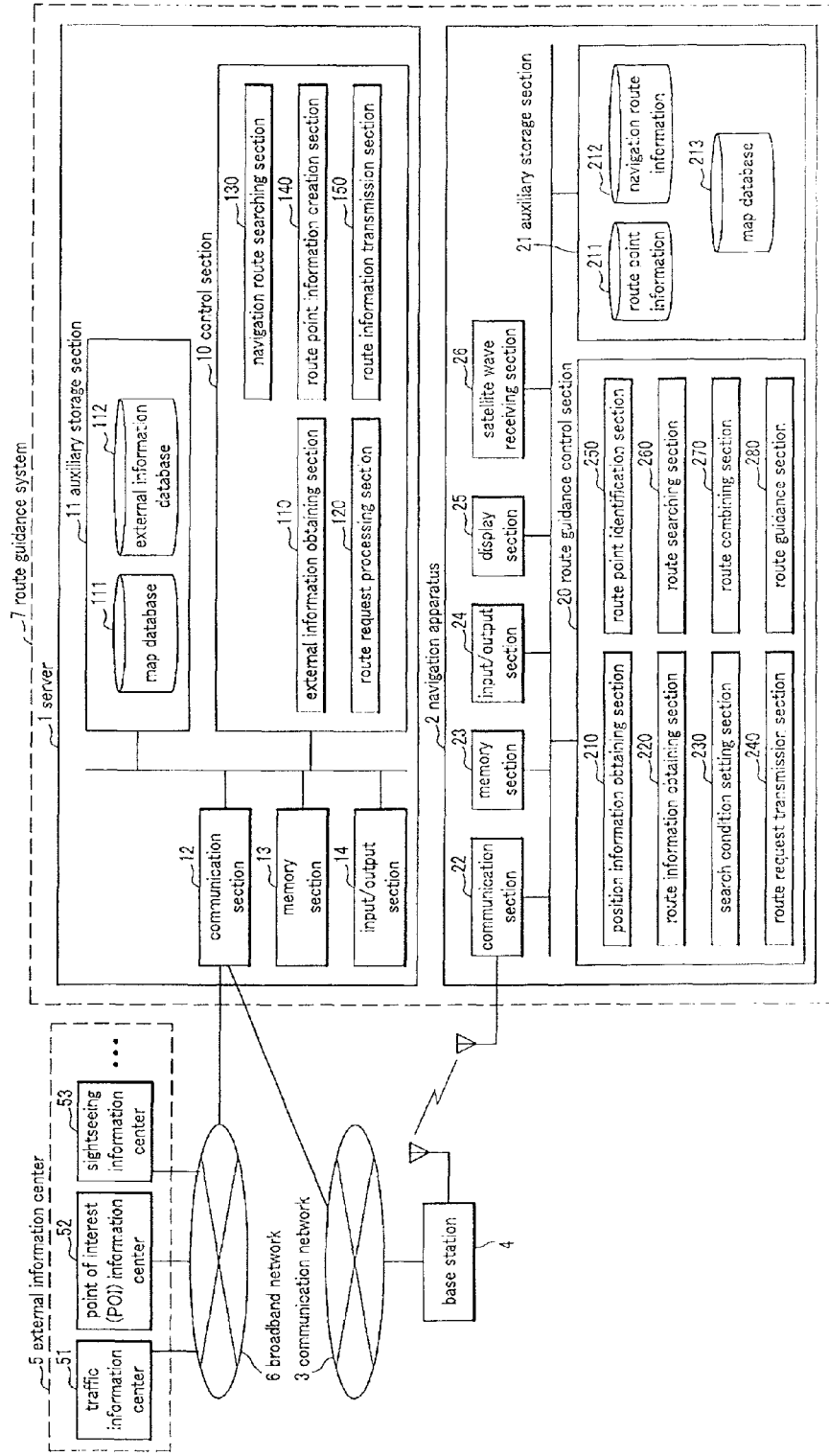
FIG. 1 is a diagram showing an example of a structure of an entire system including a route guidance system in an embodiment in accordance with the invention.

An embodiment in accordance with the invention will be described in detail below, referring to the drawings.
<Entire Structure>

FIG. 1 is a diagram showing an example of an entire structure of a system including a route guidance system in an embodiment in accordance with the invention.

As shown in FIG. 1, a route guidance system 7 has a structure including a navigation apparatus 2 mounted on a vehicle that runs on a road, and a server 1 functioning as a route guidance server of an information center that provides navigation route information and the like to the navigation apparatus 2. Herein, the server 1 and navigation apparatus 2 are connected through a communication network 3 and a base station 4, and the server 1 is connected also with an external information center 5 through a broadband network 6.

Meanwhile, the broadband network 6 referred to herein is a network for public communication, such as the Internet, and the communication network 3 is a dedicated network owned by a communication carrier for mobile phones or the like. In addition, the area between the base station 4 and the navigation apparatus 2 is a wireless communication area where a wave for mobile phones is usually used, however, waves for wireless LAN (Local Area Network) complying with the IEEE802.11 series standard or a wave for mobile WiMAX may be used. Further, broadcasting means such as FM multiplex broadcast may be used.

The external information center 5 has a structure specifically including a traffic information center 51, a point of interest (POI) information center 52, a sightseeing information center 53 and the like. From respective information centers 51, 52, and 53 in the external information center 5 through the broadband network 6 to the server 1 information respectively is provided such information as latest traffic congestion information with traffic accidents, roadwork, etc. taken into account, POI information including toll and facility opening date-hour, sightseeing information including sightseeing routes for sightseeing spots, opening hours of sightseeing facilities, event information and the like.

<Structure of Server>

As shown in FIG. 1, the server 1 has a structure including a control section 10, an auxiliary storage section 11, a communication section 12, a memory section 13, and an input/output section 14.

The control section 10 has a function, upon receipt of a request from the navigation apparatus 2, to search a route by the use of a map database 111 stored in the auxiliary storage section 11 described later, and has a structure including an external information obtaining section 110, a route request processing section 120, navigation route searching section 130, route point information creation section 140, and route information transmission section 150. In addition, functions of the control section 10 are embodied, for example, with a CPU (Central Processing Unit), not shown, loading a program stored in the auxiliary storage section 11 to the memory section 13 and executing the program.

The external information obtaining section 110 obtains various pieces of information (including audio and video information) such as traffic information, weather information, and POI information from the external information center 5, and stores the obtained information in an external information database 112 in the auxiliary storage section 11.

The route request processing section 120 receives route request information transmitted from the navigation apparatus 2, analyzes the request content, and transfers an analysis result to the navigation route searching section 130. Herein, the route request information obtained by the navigation apparatus 2 is information that includes a departure point (or current position), destination, scheduled running date/time, searching conditions, terminal identification number, position expression format and version of the used map, etc. which are necessary for route searching.

Moreover are determined searching conditions such as whether to give priority to a toll road, to give priority to distance or time, to take into account the traffic status, and others. In addition, by searching conditions, it is also possible to designate a less costly route taking account of such factors as toll discount, fuel consumption, and travel time or an environment-friendly route taking account of the $CO_2$ emission amount.

Furthermore, the searching conditions may include fuzzy conditions, such as a popular route or recommended route. In such a case, the route request processing section 120 converts fuzzy searching conditions into specific searching conditions. The route request processing section 120 converts a fuzzy condition, for example, "a popular route" into "a route of roads with a high running frequency", or "a recommended route" into "a route going through a point of users' high interest". In such a manner, the route request processing section 120 converts a fuzzy searching condition into an information-searchable condition to create a search key from the expression of the information-searchable condition. When information that agrees with the created search key is not present in the external information database 112, or when the latest information is necessary, the external information obtaining section 110 uses the search key to collect necessary information from the external information center 5, and stores collected information into the external information database 112.

Additionally, the external information obtaining section 110 collects information, such as traffic information and POI information which changes quickly and frequently and is frequently used as a route searching condition, from the external information center 5 periodically at a predetermined time interval and stores the collected information into the external information database 112 so as to always maintain the latest information.

The navigation route searching section 130 receives a request analyzed by the route request processing section 120, obtains information necessary for route searching from the map database 111 and external information database 112, and calculates a navigation route from the departure point to the destination. Herein, as an algorithm for route searching, Dijkstra's algorithm for example, which seeks a route of a minimum cost from a departure point to a destination, is used in general, however, another mathematic method may be used for calculation.

The route point information creation section 140 selects route nodes, according to a procedure, later described, from nodes at intersections included in the navigation route calculated by the navigation route searching section 130, and sets complementary points on the respective links included in the navigation route and having respective start points being the respective nodes selected as described above to make determination of the respective route nodes easy. Then, based on information on the route nodes and the complementary points thereto, the route point information creation section 140 creates rout point information including route node information (coordinate information on the route nodes and attribute information such as node type, intersection name, etc.), complementary point information (coordinate information on the complementary points, branch direction, etc.), and attribute information on links including the above-described complementary points (link type, road type, regulatory information, etc.).

Based on the route point information created by the route point information creation section 140, the route information transmission section 150 creates route information according to a predetermined transmitting data format, and transmits the created route information to the navigation apparatus 2 through the communication section 12 and the communication network 3.

The auxiliary storage section 11 is constituted by a storage device, such as a hard disk unit and a flash memory, and stores information on such databases as the map database 111 and external information database 112.

Herein, the map database 111 stores map data including the latest road data necessary for route guidance. In this situation, the map database 111 may simultaneously store plural versions of map data accompanying updating of map data. Further, the external information database 112 stores the information, such as traffic information, POI information and sightseeing information, which the external information obtaining section 110 has obtained from the external information center 5 through the communication section 12 and broadband network 6.

The communication section 12 receives the route request information transmitted from the navigation apparatus 2 through the communication network 3, and receives the information transmitted from the external information center 5 through the broadband network 6. Further, the communication section 12 transmits the route information created by the route information transmission section 150 to the navigation apparatus 2.

The memory section 13 is constituted by a RAM (Random Access Memory) and the like, stores programs to be executed by the CPU, not shown, of the control section 10, and, according to the programs, temporarily stores the map information to be read by the CPU from the map database 111 or the like and the information obtained by the communication section 12, and so on.

The input/output section 14 has a structure including input devices such as a keyboard, a mouse, a touch panel, and a display device such as a liquid crystal display, receives instruction inputs from the outside to the server 1 through an input device, and outputs various processing results obtained through processing operations by the control section 10 to the display device and the like.

<Structure of Navigator>

As shown in FIG. 1, the navigation apparatus 2 has a structure including a route guidance control section 20, an auxiliary storage section 21, a communication section 22, a memory section 23, an input/output section 24, a display section 25, and a satellite wave receiving section 26.

Based on the route information including the route point information transmitted from the server 1 through the communication section 22, the route guidance control section 20 reconstructs the route running through the route points designated according to the route point information into a navigation route, and thereby performs route guidance. The route guidance control section 20 has a structure including a position information obtaining section 210, a route information obtaining section 220, a search condition setting section 230, a route request transmission section 240, a route point identification section 250, a route searching section 260, a route combining section 270, and a route guidance section 280. Incidentally, the functions of the route guidance control section 20 are implemented, for example, such that a CPU, not shown, loads a program stored in the auxiliary storage section 21 of the navigation apparatus 2 to the memory section 23, and executes the program.

The position information obtaining section 210 obtains information that the satellite wave receiving section 26 has received from plural GPS (Global Positioning System) satellites, and calculates the current position of the navigation apparatus 2 (the position of the vehicle itself having the navigation apparatus 2 thereon). Additionally, in calculation of the current position, the current position calculated based on the information received from the GPS satellites may be corrected, using data obtained from an orientation sensor, speed sensor, or the like of the vehicle.

Via the input/output section 24, the search condition setting section 230 sets data of destination and searches conditions necessary for route guidance (conditions for searching a route, such as whether to give priority to the distance of a route or required time, to give priority to a toll road, to take into account the traffic status, to take into account the cost, to take into account the environment, and others).

The route request transmission section 240 creates route request information including the current position calculated by the position information obtaining section 210, and the destination and search conditions having been set by the search condition setting section 230, and transmits the route request information to the server 1 through the communication section 22.

Through the communication section 22, the route information obtaining section 220 obtains route information, which is transmitted from the server 1 in response to the above-described transmitted route request, the route information being formed with route point information, and stores information on a navigation route included in the route information into the auxiliary storage section 21 as route point information 211.

The route point identification section 250 refers to the stored route point information 211, and identifies a route point or a node stored in the map database 213 to which each of all the route points designated by the route point information correspond. Thus, the route point information is formed, as described later, so as to include route node information on plural route nodes, complementary point information (coordinate information, branch direction, etc.) corresponding thereto, and attribute information (node type, name of intersection, etc.). The route point identification section 250 forms temporary links with the respective route nodes and complementary points being the start and end points thereof, and performs a matching process that checks the temporary links with road links of the map database 213 link by link with respect to the coordinates, directions, attribute information on the temporary links (link type, road type, regulatory information, etc.), and the like.

Based on the route information (route point information 211) transmitted from the server 1, the route searching section 260 searches a route from the departure point to the destination running through the route points identified by the route point identification section 250, under the same conditions as those having been set by the search condition setting section 230, and stores information on a searched route (route $R_1$) as navigation route information 212.

Furthermore, if the departure point and the destination included in the route information (in other words, information representing the route $R_1$) transmitted from the server 1 are different respectively from the current position obtained by the satellite wave receiving section 26 and the final destination designated via the input/output section 24, the route searching section 260 searches a route (route $R_0$) from the current position obtained by the satellite wave receiving section 26 to the departure point included in the route information transmitted from the server 1, and a route (route $R_2$) from the destination included in the route information transmitted from the server 1 to the final destination designated via the input/output section 24.

In addition, if the route information obtaining section 220 has not received route information (route point information 211) from the server 1, then, based on the destination and search conditions having been input via the input/output section 24 and the position information on the current position obtained by the position information obtaining section 210, the route searching section 260 searches a navigation route (route $R_{30}$) to the destination, referring to the map database 213 in the auxiliary storage section 21.

The route combining section 270 forms a route by connecting and combining the route $R_0$, a route $R_1$, and a route $R_2$ searched by the route searching section 260 as a final navigation route (route $R_3$) and stores it to be the navigation route information 212.

The route guidance section 280 performs route guidance to the destination, based on the navigation route (route $R_3$)

stored in the auxiliary storage section 21 as the navigation route information 212, and the position information on the current position obtained by the position information obtaining section 210. Further, if the route information obtaining section 220 has not received route information (route point information 211) from the server 1, the route guidance section 280 performs route guidance, based on the above-searched route $R_{30}$.

The auxiliary storage section 21 is constituted by storage devices such as a hard disk device and a flash memory, and stores information including the route point information 211, the navigation route information 212, and the map database 213.

Herein, the route point information 211 is route information on the navigation route including the route point information transmitted from the server 1 and is stored in the auxiliary storage section 21. The navigation route information 212 is route information on the searched navigation route from the departure point to the destination (route R3 or R30) including route points designated by the route point information 211, and is stored in the auxiliary storage section 21.

Further, the map database 213 contains map data that is necessary for identification of route points, route searching, and guided guidance, and is stored in the auxiliary storage section 21. Such map data is formed including road data with link data and node data of roads, destination search data such as a facility name and a telephone number used for reducing destination candidates to search destinations, background drawing data for drawing a map background on the display section 25, route instruction data for giving an instruction of turning right or left at an intersection and driving on a running lane to be taken, and the like.

The link data of the road data is formed including coordinate information representing the positions of links, connection information on connections between links, and in addition, link lengths, link cost information such as required times for passing links (link travel times), attribute information on links (link type, road type, regulatory information, etc.). Further, the node data is formed including position information and attribute information (node type, intersection name) on nodes.

The communication section 22 transmits route request information created by the route request transmission section 240 to the server 1 through the communication network 3. Further, the communication section 22 receives route information transmitted from the server 1 and delivers the route information to the route information obtaining section 220 in the route guidance control section 20.

The memory section 23 is constituted by a RAM, a flash memory, and the like, stores a program to be executed by the CPU, not shown, of the route guidance control section 20 and the map database 213, and stores data, as necessary, such as the route point information 211 and navigation route information 212, and the like created through execution of the program.

The input/output section 24 has a structure including, for example, a remote controller and a touch panel, and receives instructions from the outside to be transmitted to the navigation apparatus 2. Further, the input/output section 24 may be provided with a speaker to output a voice guidance of a processing status or a processing result, in response to various control processes performed by the route guidance control section 20.

The display section 25 is constituted by a liquid crystal display and the like, and displays, under control by the route guidance control section 20, a map of the vicinity of the current position of the vehicle, a navigation route to a destination, navigation guidance information at an intersection, and the like, which are to be output according to certain functions integrated in the route guidance section 280.

The satellite wave receiving section 26 receives waves necessary for calculation of the current position of the navigation apparatus 2 from GPS satellites. The satellite wave receiving section 26 receives position information, time information, and the like transmitted normally from four GPS satellites, and obtains the respective receipt times. Based on the received time information and the like, the position information obtaining section 210 obtains the distances (pseudo distances) to the respective GPS satellites, and calculates the current position of the vehicle itself, based on the distance information and the position information of the GPS satellites.

<Operation of Route Guidance System>

Figure 2:
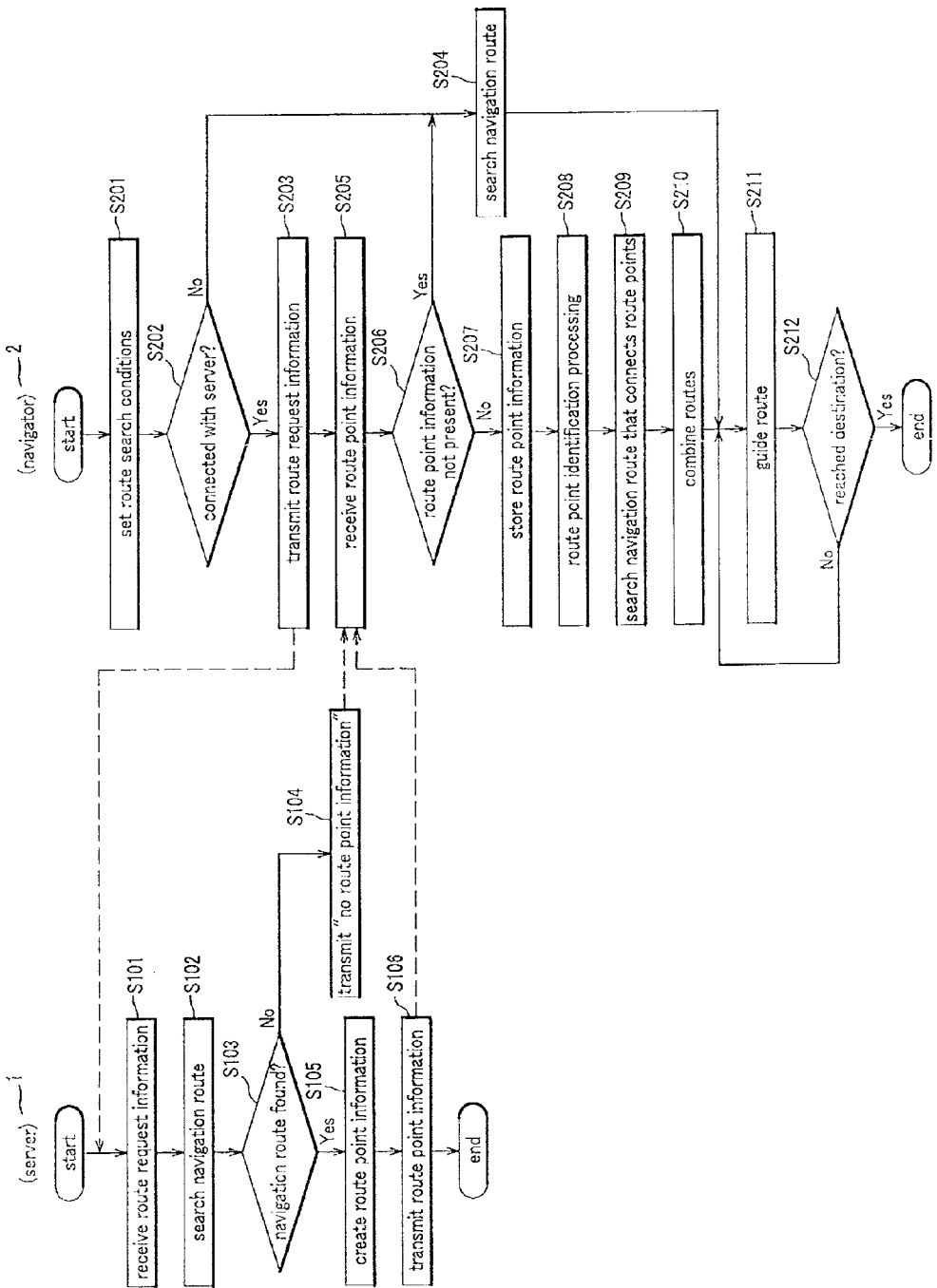
FIG. 2 is a flowchart showing an example of the entire operational procedure of the route guidance system in the embodiment in accordance with the invention.

Now, referring to FIG. 1, the entire operation procedure of the route guidance system 7 will be described in detail along the flow shown in FIG. 2. FIG. 2 is a flowchart showing an example of the entire operation procedure of the route guidance system 7 in the present embodiment in accordance with the invention.

As has been described with reference to FIG. 1, the control section 10 of the server 1 can search a route from a designated departure position to a designated destination by the navigation route searching section 130. Further, the route guidance control section 20 of the navigation apparatus 2 can search a route from the current position or the designated departure point to the designated destination by the route searching section 260.

In this situation, the operation of the route guidance system 7 starts with determining whether to perform the route searching with the server 1 or with the navigation apparatus 2. This is because a route searched by the server 1 and a route searched by the navigation apparatus 2 are not necessarily the same. As a matter of course, the server 1 is capable of searching a route with a higher added value than a route searched by the navigation apparatus 2.

In addition, the map database 111 held by the server 1 has an information amount larger than that of the map database 213 held by the navigation apparatus 2, and further, the latest information is reflected therein. For example, the map database 111 of the server 1 is always updated into map data of a latest version, and further, the latest information on the traffic congestions of roads and the like obtained from the traffic information center 51 is reflected in the link travel times of the map database 111. In contrast, the map database 213 of the navigation apparatus 2 is not necessarily the map data of a latest version, and further, the latest information on the traffic congestions of roads and the like is not reflected in the link travel times of the map database 213.

Therefore, a user first sets, via the input/output section 24 of the navigation apparatus 2, a departure position, destination, and various search conditions for a route (priority to required time, priority to distance, priority to cost, priority to ecology, priority to highway, etc.). That is, through processing by the search condition setting section 230, the route guidance control section 20 of the navigation apparatus 2 displays a message prompting setting of search conditions for a route including the departure point and the destination on the display device of the display section 25, and sets search conditions for a route including the departure point and destination, based on information that is input by the user via the input/output section 24 in response to the display (step S201).

At this moment, the search conditions include selecting whether to perform route searching by "server 1" or "navigation apparatus 2". Accordingly, the user inputs instruction information on selection between them.

Then, based on the instruction information input by the user, the route guidance control section 20 determines whether or not to connect the navigation apparatus 2 to the server 1 (step S202). That is, in a case where the instruction information input by the user is "to perform route searching by the server 1", in other words, in a case of connecting the navigation apparatus 2 to the server 1 (step S202→Yes), the route guidance control section 20 transmits route request information including the departure point (In this case, the departure point is designated by the user, or is the current position of the vehicle.), destination, search conditions, to the server 1 (step S203).

On the other hand, in a case where the instruction information input by the user is "to perform route searching by the navigation apparatus 2", in other words, in a case of not connecting the navigation apparatus 2 to the server 1 (step S202→No), without connecting the navigation apparatus 2 to the server 1, the route guidance control section 20 searches a navigation route to the destination by the use of the map database 213 stored in the auxiliary storage section 21 of the navigation apparatus 2 on the vehicle itself (step S204).

When the route request information is transmitted to the server 1 by the processing in step S203, the control section 10 of the server 1 receives the route request information via the communication section 12 through processing by the route request preprocess section 120 (step S101). Then, through processing by the navigation route searching section 130, the control section 10 searches a navigation route designated by the departure point (or the current position of the vehicle), the destination, the search conditions, and the like included in the above-described route request information (step S102).

Herein, as evaluation indexes for a navigation route in searching a navigation route, the control section 10 can set a distance, a travel time, a cost (a fuel consumption amount, a highway toll, a labor cost for the travel, etc.), a $CO_2$ emission amount, and the like of the navigation route. As travel times to be used here, in addition to the travel times of respective road links stored in advance in the map database 111, it is possible to use the travel times of the respective road links which are calculated based on current traffic information or predicted traffic information obtained from the traffic information center 51.

Then, through searching processing for a navigation route in step S102, if calculation of a navigation route has failed while a navigation route satisfying the designated search conditions has not been found (step S103→No), then the control section 10 transmits, to the navigation apparatus 2, information indicating that route information has not been obtained (in other words, "absence of route point information"), as processing by the route information transmission section 150 (step S104).

On the other hand, through searching processing for a navigation route in step S102, if a navigation route satisfying the designated search conditions has been found (step S103→Yes), then the control section 10 transmits the navigation route information to the navigation apparatus 2. In the present embodiment, it is assumed that navigation route information is expressed on the basis of coordinate information on latitudes and longitudes, and the number of route points representing a navigation route is reduced to reduce the information amount.

Herein, the control section 10 selects route nodes from the nodes (namely, intersections) included in the navigation route through processing by the route point information creation section 140, further sets complementary points for easy determination of the selected route nodes, and creates route point information, based on the information on the route nodes and complementary points (step S105). Additionally, creation of route point information will be described later in detail, referring to FIGS. 3 and 4, and the structure of the route point information will be described later in detail, referring to FIG. 6.

Then, the control section 10 transmits the created route point information via the communication section 12 to the navigation apparatus 2 through processing by the route information transmission section 150 (step S106).

Subsequently, through processing by the route information obtaining section 220, the route guidance control section 20 of the navigation apparatus 2 receives the route point information transmitted from the server 1 (step S205). If the received route point information is information indicating "absence of route point information" (step S206→Yes), then the route guidance control section 20 of the navigation apparatus 2 searches a navigation route to the destination, using the map database 213 stored in the auxiliary storage section 21 of the navigation apparatus 2 of the vehicle itself (step S204). On the other hand, if the received route point information is significant route point information (in other words, in a case of "presence of route point information" (step S206→No), then the route guidance control section 20 of the navigation apparatus 2 stores the received route point information as route point information 211 in the auxiliary storage section 21 (step S207).

Then, through processing by the route point identification section 250, referring to the route point information 211 and map database 213 in the auxiliary storage section 21, the control section 10 performs map-matching on the route nodes of the navigation route designated by the route node information and complementary point information included in the route point information 211, using the map database 213, and thereby performs identification processing of the route points, wherein the identification preprocessing relates the above-described route nodes to node numbers or link numbers of the road data of the map database 213 (step S208). Incidentally, the route point identification processing will be described later in detail, referring to FIG. 7.

Then, through processing by the route searching section 260, the control section 10 searches route connecting nodes or links at the above identified route points, sequentially from the departure point side (step S209), and stores the searched route (route $R_1$) as the navigation route information 212 in the auxiliary storage section 21. Further, if the departure point and the destination of the navigation route obtained from the server 1 (that is, route $R_1$) are different respectively from the current position of the navigation apparatus 2 and the final destination, the control section 10 further searches a route (route $R_0$) from the current position to the departure point of the route $R_1$ and a route (route $R_2$) from the destination of the route $R_1$ to the final destination respectively.

Then, as a result of the route searching, if plural navigation routes (route $R_0$, route $R_1$, and route $R_2$) have been obtained, the control section 10 performs route combining processing that connects the route $R_0$, route $R_1$, and route $R_2$, and creates an entire navigation route, through processing by the route combining section 270 (step S210). Incidentally, the route combining processing will be described later in detail, referring to FIGS. 8 and 9.

Then, through processing by the route guidance section 280, the control section 10 uses the navigation route created in step S210 or step S204, also uses the position information on the present position obtained via the position information obtaining section 210, and thereby performs route guidance processing that displays a map in the vicinity of the vehicle, a course instruction at an intersection, or the like on the display device of the display section 25 (step S211). Further, the control section 10 determines whether or not the current position has reached the destination (step S212). If the current position has not yet reached the destination (step S212→No), then the control section performs the route guidance processing again (step S211), and if the current position has reached the destination (step S212→Yes), then the control section 10 terminates the entire processing on the navigation apparatus 2.

For the route guidance system 7, which has been described above with reference to FIG. 2, it is assumed that the server 1 searches a navigation route that satisfies a route request transmitted from the navigation apparatus 2, creates route point information, based on this navigation route, and provides the created route point information to the navigation apparatus 2. Herein, as the terminal device of the server 1, for example, a personal computer installed at home or in an office or a mobile phone as a personal information terminal or the like may be used instead of the navigation apparatus 2.

In this case, a personal computer or mobile phone is convenient for making a travel plan at home or outside, which enables processing up to the step of receiving route point information from the server 1 (step S205), or the step of searching a navigation route which connects route points (step S209). Herein, the personal computer or mobile phone stores route point information obtained from the server 1 or navigation route information searched based on the route point information into a movable storage medium such as a USB (Universal Serial Bus) memory, for example. Then, by connecting the movable storage medium to the navigation apparatus 2, the route point information obtained through planning a travel by the use of the personal computer or mobile phone, or the navigation route information searched based on the route point information, can be transferred to the navigation apparatus 2. Thus, the user can utilize the route of the travel plan made using the personal computer or mobile phone, on the navigation apparatus 2.

Figure 3:
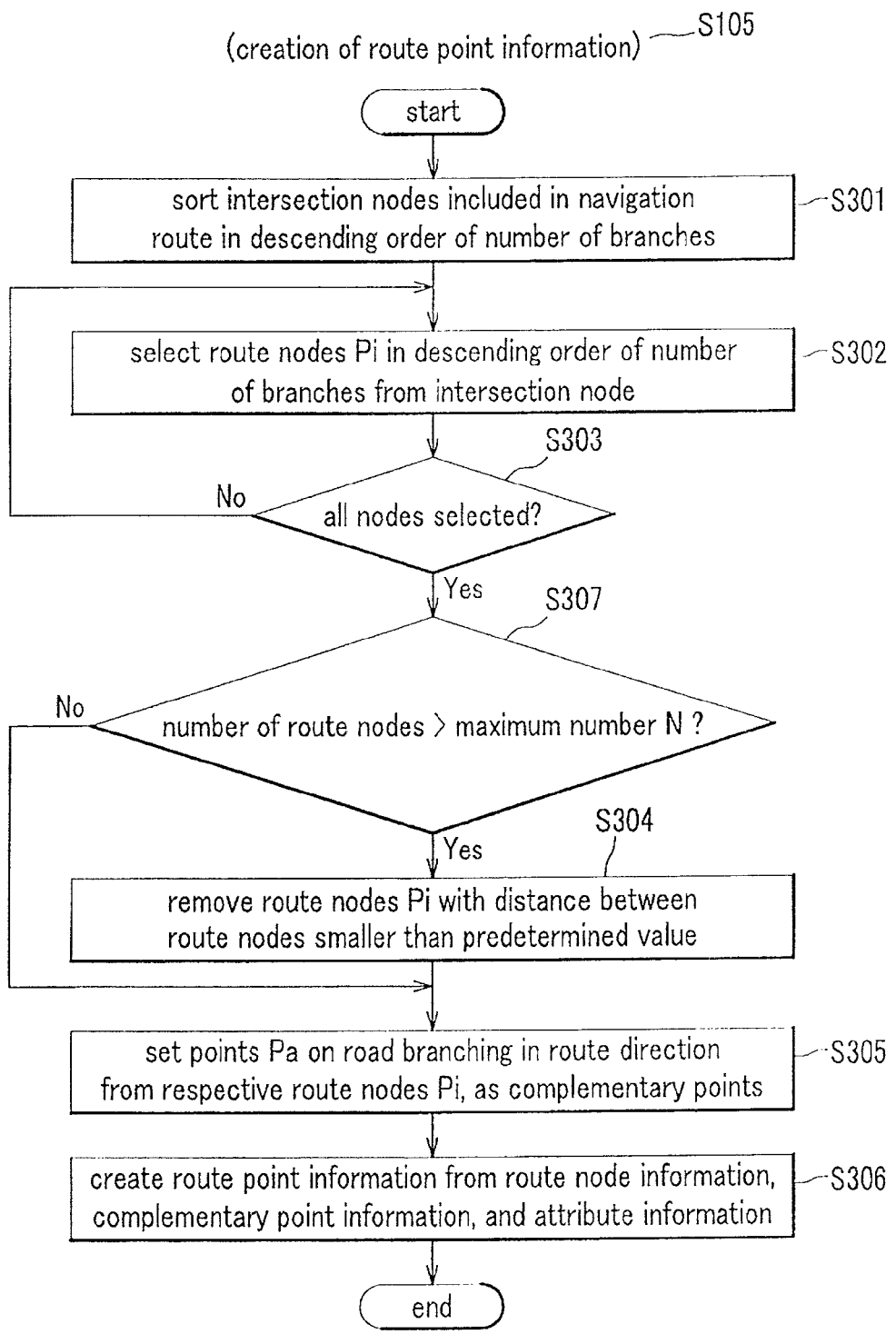
FIG. 3 is a diagram showing an example of a processing flow of a creation process of route point information, on a server in the embodiment in accordance with the invention.
Figure 4:
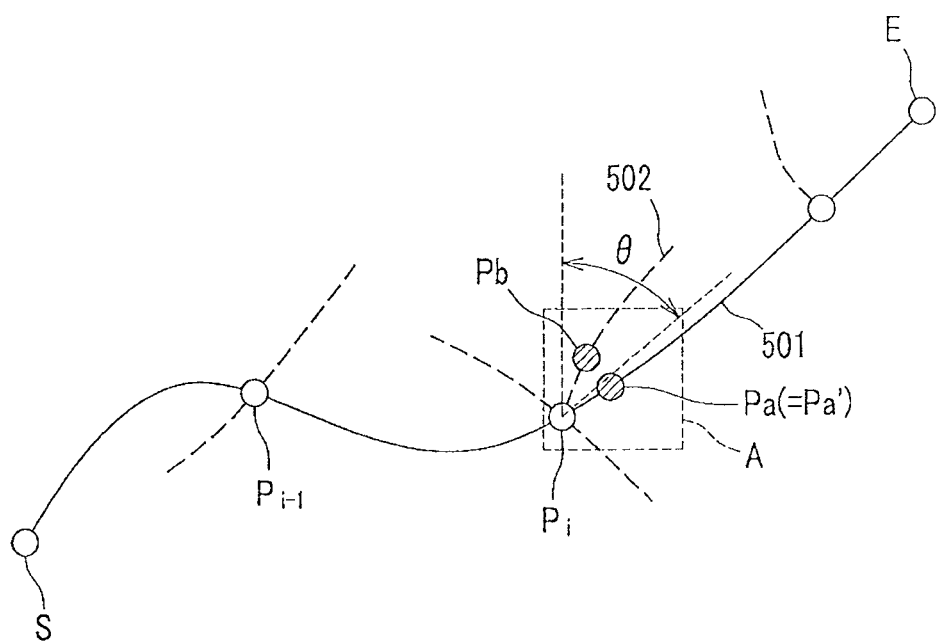
FIG. 4 is a diagram for illustration of selection of route points and setting of complimentary points in the embodiment in accordance with the invention.

Now, referring to FIGS. 3 and 4, the processing of creating route point information (step S105 in FIG. 2) on the server 1 will be described in detail. Herein, FIG. 3 is a diagram showing an example of a processing flow of the processing of creating route point information, on the server 1 in the present embodiment in accordance with the invention. FIG. 4 is a diagram for illustration of selection of route points and setting of complimentary points in the present embodiment in accordance with the invention.

As shown in FIG. 3, the control section 10 first sorts intersection nodes included in the navigation route searched by step S102 in FIG. 2 in the descending order of the number of branches from the intersection node (step S301), and selects a route node $P_i$ in the descending order of the number of branches from the intersection node (step S302). Then, if all the nodes at the intersection nodes included in the navigation route have not been selected yet (step S303→No), selection of route nodes in step S302 is repeatedly performed.

On the other hand, if all the nodes have been selected (step S303→Yes) and the number of selected route nodes exceeds a maximum number N (step S307→Yes), then the control section 10 removes route nodes $P_i$ with a distance between the selected route nodes (the distance between the route node $P_{i-1}$ last previously selected and the route node $P_i$ currently selected) being smaller than a predetermined value (step S304) to prevent concentration of route nodes in a small area. Herein, the maximum number N of route nodes is a value having been set taking into account the communication load (cost and time) in transmitting route point information to the navigation apparatus 2.

When selection of route nodes is completed in such a manner (completion of step S304, or step S307→No), points on the roads branching from the respective selected nodes along the route direction are set as complementary nodes (step S305). The processing of setting complementary points will be described later in detail, referring to FIG. 5.

Although a method of performing selection of route nodes with priority to intersection nodes with a larger number of branches has been described above, selection of route nodes may be performed targeting at intersection nodes with a distance longer than a predetermined distance from a start point S in terms of the straight line distance or the distance along the road. Thus, even when the navigation apparatus 2 has passed the start point S due to movement of the vehicle during the navigation apparatus 2 is requesting the server 1 for a route, it is possible to effectively search a route using all route nodes obtained from the server 1 in S209. Further, it is possible to prevent calculating a route that runs again through a route node/nodes already having been passed. This problem with calculating a route that runs again through a route node already having been passed can also be solved by a method that detects route nodes having been passed and searches a route that connects route nodes, eliminating the detected route node/nodes, in step S209.

Now, complementary points will be described, referring to FIG. 4. In FIG. 4, S represents a start point (departure point), E represents an end point (destination), a solid line curve represents a navigation route, broken line curves represent roads not being on the navigation route, and hollow circles represent route points (including the start point S and end point E) on the navigation route. Herein, the hatched circle $P_a$ represents a complementary point provided to the route point $P_i$.

Such complementary points are added information for determining a navigation route without an error when the navigation apparatus 2 has received route point information. For example, in the example shown in FIG. 4, by adding the complementary point $P_a$ to the route point $P_i$, it is possible to determine a route 501 included in the navigation route without mistaking a route 502, which branches from a route point $P_i$ and is not included in the navigation route, for the route 501 included in the navigation route.

Referring to FIG. 3 again, the control section 10 creates route point information with route node information formed of coordinate information and attribute information (node attribute, intersection name, etc.) on route nodes having been selected as described above, complementary point information formed of coordinate information on complementary points having been set as described-above, and attribute information (road type, link type, number of lanes, road width, etc.) on road links running from the route nodes toward the complementary points and including the complementary points (step S306). Incidentally, the structure of route point information will be described later in detail, referring to FIG. 6.

Figure 5:
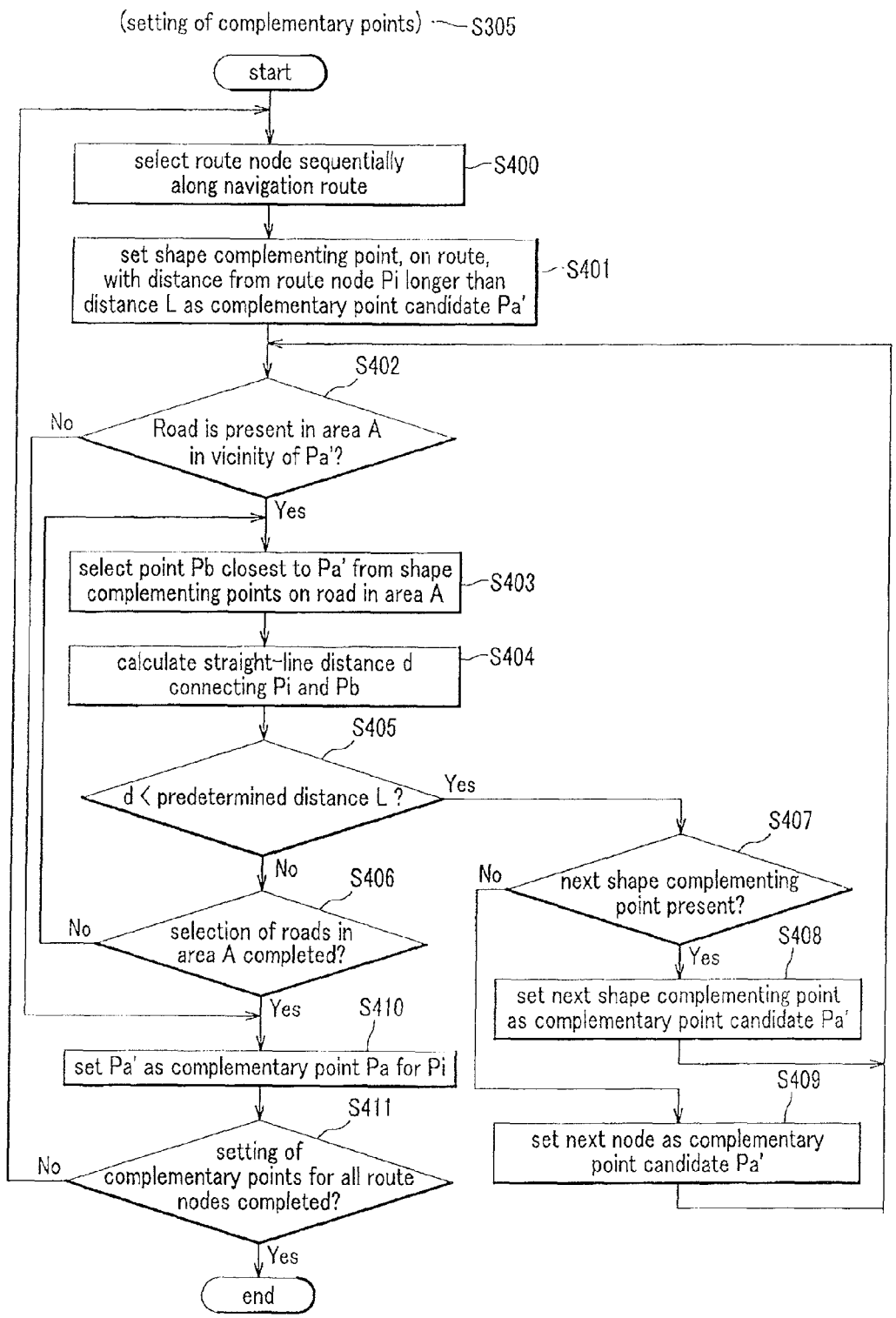
FIG. 5 is a diagram showing an example of a processing flow of a setting process of complementary points on the server in the embodiment in accordance with the invention.

Now, referring to FIG. 5 (also referring to FIG. 4, as necessary), processing of setting complementary points (step S305 in FIG. 3) on the server 1 will be described in detail below. Herein, FIG. 5 is a diagram showing an example of a processing flow of a setting process of complementary points on the server 1 in the present embodiment in accordance with the invention.

Upon starting the process of setting complementary points, the control section 10 selects route nodes $P_i$ from the route nodes $P_i$ that have been selected, sequentially along the navigation route (step S400), and sets complementary points for the each route node $P_i$ in subsequent processing.

The control section 10 first selects a shape complementing point, on the navigation route, with a distance from a route node $P_i$ longer than a predetermined distance L, as a complementary point candidate $P_a'$ (step S401). Incidentally, a shape complementing point is a point having coordinate information (latitude/longitude) and provided on a road link to express the shape of the road link in the map data of the map database 111.

Then, referring to the map database 111, the control section 10 determines whether or not a road excluded from the navigation route is present in an area A (the part surrounded by a dashed rectangle in FIG. 4), the area A being set in the vicinity of the complementary point candidate $P_a'$ and having a predetermined size (step S402). If no road excluded from the navigation route is present (step S402→No) in the area A, the control section 10 settles the complementary point candidate $P_a'$ as a complementary point $P_a$ for the current route node $P_i$ (step S410).

On the other hand, if there are one or more roads excluded from the navigation route in the area A (step S402→Yes), the control section 10 selects one of the excluded roads in the area A, calculates a straight line distance between each of the shape complementing point on the selected road in the area A and the complementary point candidate Pa' on the navigation route, and selects the shape complementing point $P_b$ (refer to FIG. 4) being the closest to $P_a'$ (step S403).

Then, the control section 10 calculates the straight-line distance "d" connecting the route node $P_i$ with the shape complementing point $P_b$ (step S404). If the straight-line distance "d" is shorter than the predetermined distance L (step S405→Yes), the control section 10 determines whether or not a next shape complementing point is present on the navigation route (step S407), and if a shape complementing point is present (step S407→Yes), the control section 10 sets anew this shape complementing point as the complementary point candidate Pa' (step S408), returns to step S402, and reiteratively performs the processing steps in and after step S402. If a next shape complementing point is not present (step S407→No), the control section 10 sets the next node on the navigation route as the complementary point candidate $P_a'$ (step S409), returns to step S402, and reiteratively performs the processing steps in and after step S402.

Further, in step S405, if the straight line distance "d" is longer than the predetermined distance L (step S405→No), the control section 10 determines whether or not selection of all the roads present in the area A is completed (step S406), and if the selection is not yet completed (step S406→No), returns to step S403, and reiteratively performs the processing steps in and after step S403.

Further, in step S406, if selection of all the roads in the area A is completed (step S406→Yes), the control section 10 settles the complementary point candidate $P_a'$ as the complementary point $P_a$ for the current route node $P_i$ (step S410).

Then, the control section 10 determines whether or not complementary points $P_a$ have been set to all the route nodes $P_i$ on the navigation route (step S411). If setting of complementary points $P_a$ to all the route nodes $P_i$ is not completed (step S411→No), the control section 10 returns to step S400, and reiteratively performs the processing steps in and after step S400. If setting of complementary points $P_a$ for all the route nodes $P_i$ is completed (step S411→Yes), the control section 10 terminates this complementary point setting processing.

In such a manner, each complementary point $P_a$ for the respective route nodes $P_i$ is set at a point that is not close to roads in the surrounding. Accordingly, even if the coordinate values of a complementary point having been set by the server 1 are deviated a little from the coordinates of the road data stored in the map database 213 on the side of the navigation apparatus 2, the possibility is extremely low that the position of each of the route nodes $P_i$ included in the navigation route information transmitted from the server 1, is falsely identified to be on a road link excluded from the navigation route, because the complementary point $P_a$ is set at a position distant from surrounding roads, in other words, at a position where roads are not concentrated.

FIG. 6 is a diagram showing an example of the data format of route point information provided from the server 1 to the navigation apparatus 2 in the present embodiment in accordance with the invention. As shown in FIG. 6, the route point information is formed of the number of route nodes, the coordinates of the route nodes, the coordinates of the complementary points, and the attribute information.

Herein, the values of latitudes and longitudes, which can be handled commonly among map data created by different manufacturers or of different versions, are used as the coordinate values of the route node coordinates and complementary point coordinates, however, normalized coordinates (mesh coordinate, X coordinate, Y coordinate) may be used in a case where conversion between map coordinate systems is possible.

The attribute information includes information that determines route nodes and links connecting the route nodes along the direction for the destination of the navigation route, such as, for each route node, the type of the route node (intersection, tollgate, junction, entrance of a service area or parking area, etc.), the name of the intersection at the route node, the branch direction θ of from the route node toward the complementary point (as shown in FIG. 4, the clockwise angle from the reference direction of true-north), the road type of the road running from the route node toward the complementary point (national road, prefectural road, etc.), the link type of the road (in an intersection, tunnel, elevated way, etc.), distance to the next route node, and the like. Though not shown, the attribute information further includes various information related to the route, such as toll information on effective service and discounted/non-discounted tolls in a case of a route with an effective discounted toll service, information related to a environment issue such as the reduction amount of $CO_2$ in a case of a route taking into account environment issues, still further, fuel consumption information, information on roadside resting areas and sightseeing spots, and the like.

Incidentally, the attribute information may be added with other kinds of attribute information (the number of lanes, road width, etc.) related to nodes and road links included in the map database 111 in addition to the above-described information, however, it is desirable to limit the information to requisite minimum to prevent increase in the communication load in providing route point information to the navigation apparatus 2.

FIG. 7 is a diagram showing an example of a processing flow of identification processing of route points and route searching processing (steps S208 and S209 in FIG. 2) on the navigation apparatus 2 in the present embodiment in accordance with the invention.

Referring to the route point information 211 in the auxiliary storage section 21, the route guidance control section 20 of the navigation apparatus 2 first reads the route node information, complementary point information, and attribute information in the order of the route points (step S701), and forms a temporary link connecting the route node and complementary point represented by the above-described pieces of information (step S702).

Then, using the attribute information (coordinates, road type, and link type) on this temporary link, the route guidance control section 20 searches a candidate road matching this temporary link, from road data stored in the map database 213 (step S703), Then, if a candidate road has been found as a result of the search in step S703 (step S704→Yes), the route guidance control section 20 searches a node that matches the coordinates and attributes (node type and name) of the route node from intersection nodes included in the candidate road (step S705).

Then, if a node matches the coordinate values and node attribute information of the route node has been found as a result of the search in step S705 (step S706→Yes), then the route guidance control section 20 associates the node number of the matching node, the number being managed by the map database 213, with the route node (step S707).

Further, the route guidance control section 20 searches a road link that branches from the node with the above-described node number in the direction of the above-described temporary link or the branch direction θ included in the attribute information (step S708). As a result of the search, if a matched road link has been found (step S709→Yes), the route guidance control section 20 associates the link number of the matched road link, the link number being managed by the map database 213, with the above-described temporary link (step S710), and recognizes the matched link to be a route link of the navigation route based on the road data of the map database 213.

Then, the route guidance control section 20 determines whether or not identification processing of all the route nodes is completed (step S711), and if not completed (step S711→No), then the route guidance control section 20 returns to step S701 and repeatedly performs the processing in step S701 and after.

In such a manner, the route guidance control section 20 can associates node numbers on the map database 213 with the respective route nodes included in the route point information, the node numbers corresponding to the respective route nodes, and further associates the link numbers on the map database 213 with the road links (hereinafter, referred to as route links) branching from the respective route nodes toward the destination on the navigation route.

Incidentally, if a matched candidate road is not found on the map database 213 in the process of associating node numbers or link numbers (step S704→No), if a matched node is not found (step S706→No), or if matched link is not found (step S709→No), then it is determined that a road matching the current route node is not present, and associating the node number or link number is omitted.

Further, if a matched node is not found in step S706 (step S706→No), the route guidance control section 20 further determines whether or not the current route node is a node being set as the start or end point of the navigation route (step S715). As a result of the determination, if the node is one having been set as either the start or end point (start point S or end point E in FIG. 4) (step S715→Yes), the next or the immediately preceding route node is set as the start or end node (step S716). That is, if the current node is the start point, the next route node is set as the start point, and if the current node is the end point, the immediately preceding route node is set as the end point. Incidentally, it is assumed that start or end point information has been given as attribute information on a route node.

In the above described manner, in a case where the start or end point cannot be identified by the map database 213 of the navigation apparatus 2, an error in reconstructing a route caused by failure to identify the start or end point can be prevented by resetting the start or end point. Accordingly, on the navigation apparatus 2, it is possible to make the most of the navigation route provided by the server 1, using the map database 213 of the navigation apparatus 2 itself.

Then, if the route guidance control section 20 has completed the identification processing of all the route nodes (step S711→Yes), the route guidance control section 20 searches a route from the start point S to the end point E running through the route links identified through the identification processing (step S712), and obtains a navigation route represented by link numbers based on the map database 213. A navigation route obtained thus will be hereinafter referred to as "a reconstructed navigation route" or merely as "a reconstructed route".

Then, the route guidance control section 20 compares the distances between adjacent route nodes on the reconstructed route with the corresponding distances between adjacent route nodes included in the route point information transmitted from the server 1 (refer to FIG. 6: the distance to the next node in the attribute information), and if any deviation is greater than a predetermined amount (step S713→Yes), the route guidance control section 20 outputs a route reconstruction error notifying the user of a possibility that the route is not correctly reconstructed (step S714).

Figure 8:
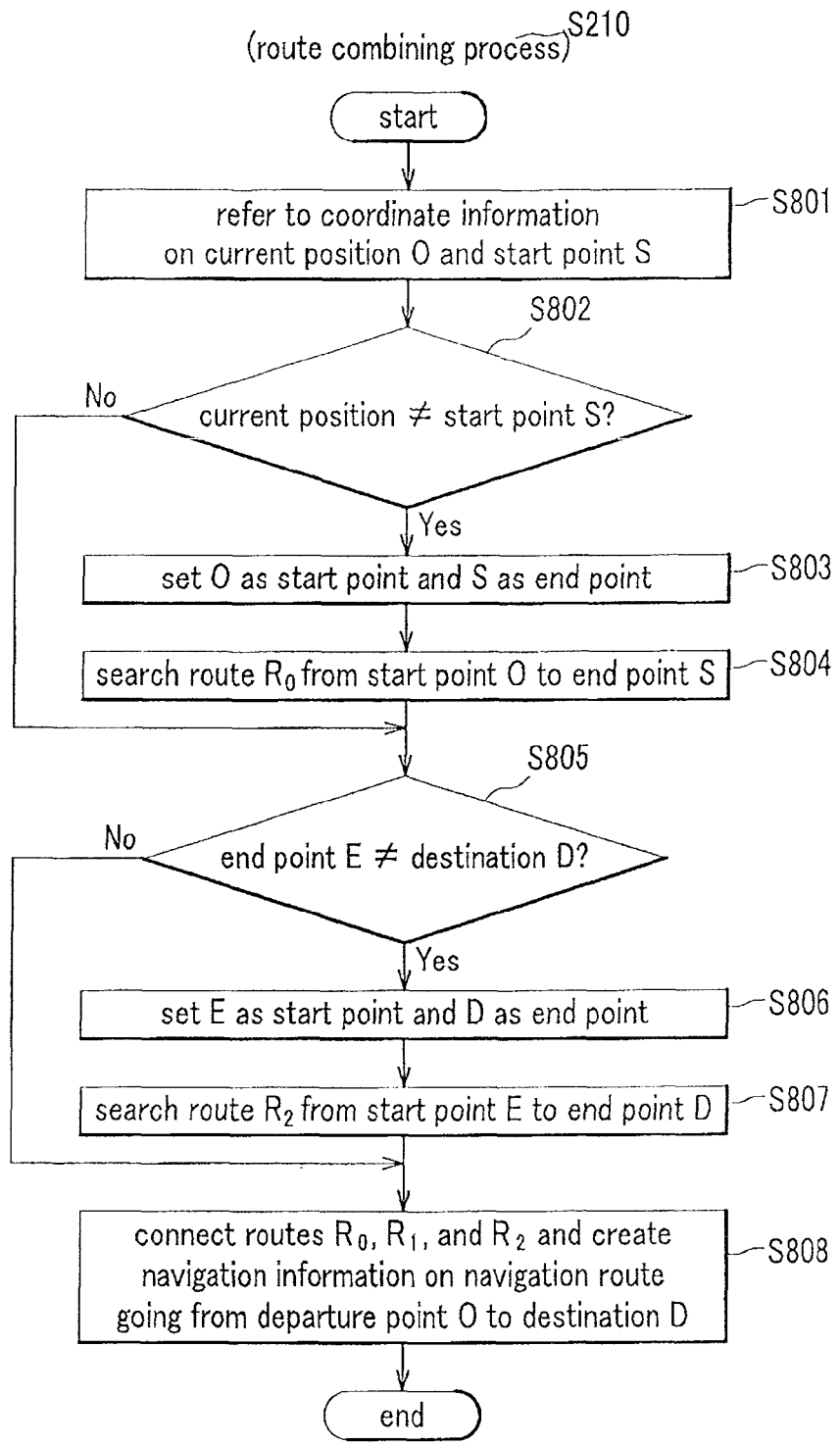
FIG. 8 is a diagram showing an example of a processing flow of a route combining process (step S210 in FIG. 2) on the navigation apparatus in the embodiment in accordance with the invention.
Figure 9:
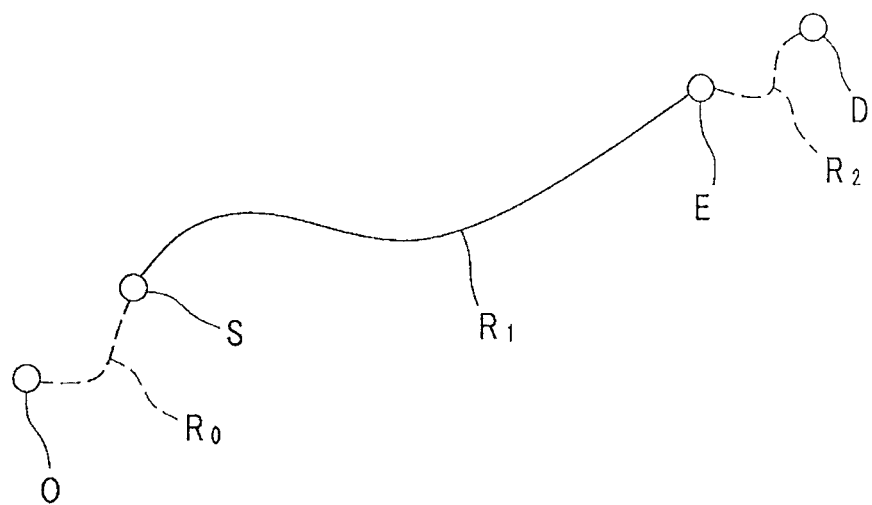
FIG. 9 is a diagram for illustration of route combining on the navigation apparatus in the embodiment in accordance with the invention.

FIG. 8 is a diagram showing an example of a processing flow of a route combining process (step S210 in FIG. 2) on the navigation apparatus 2 in the present embodiment in accordance with the invention. FIG. 9 is a diagram for illustration of the route combining process on the navigation apparatus 2.

In FIG. 9, the route $R_1$ shown by the solid line curve is a route reconstructed from the navigation route running from the start point S to the end point E, wherein the reconstructed route has been searched by the route searching section 260 of the navigation apparatus 2, based on the route point information transmitted from the server 1. The point O represents the current position of the vehicle obtained from information received by the satellite wave receiving section 26, and D represents the destination which the user has set via the input/output section 24. Further, the route $R_0$ shown by a broken line curve represents a route running from the current position O to the start point S, and the route $R_2$ represents a route going from the end point E to the destination D.

First, the route guidance control section 20 refers to the coordinate information on the current position O of the vehicle and the start point S of the route $R_1$ (step S801). If the coordinate information is different between the two (step S802→Yes), the route guidance control section 20 sets the current position O as the start point, and the start point S of the route $R_1$ as the end point (step S803), and searches a route R0 running from the current position O to the start point S by the route searching section 260 (step S804). Incidentally, if the coordinate information is the same between the two (step S802→No), it is not necessary to perform step S803 nor step S804.

Then, if the end point E of the route $R_1$ and the position of the destination D are different respectively from each other (step S805→Yes), the route guidance control section 20 sets the end point E as the start point, and sets the destination D as the end point (step S806), and searches a route $R_2$ going from the end point E to the destination D by the route searching section 260 (step S807). Incidentally, if the coordinate information is the same between the two (step S805→No), it is not necessary to perform step S806 nor step S807.

Further, the route guidance control section 20 connects the searched plural routes $R_0$, $R_1$, and $R_2$, at the corresponding start and end points, and thereby creates a navigation route going from the departure O to the destination D (step S808). In such a manner, by connecting plural routes and thus creating a single route, audio messages or the like, such as "A route guidance will start." and "The vehicle will arrive at the destination.", which are to be output via a speaker or the like at the departure point or destination, are prevented from being output during running on the route. Further, even at the connection points between the routes $R_0$, $R_1$, and $R_2$, it is possible to provide a user, before an intersection, with guidance information on the distance to the intersection supposed to be passed, the left/right turning direction, the enlarged view of the guidance intersection, and the like.

As has been described above, in the present embodiment, it is assumed that, in the operation of the route guidance system 7, "the departure point (start point S) and destination (end point E) in the request from the route guidance control section 20 to the server 1 for searching a navigation route" and "the current position having been obtained during running or having been set (departure point O) and destination (final destination D)" are different from each other. With this assumption, the route guidance control section 20 is provided with the route combining section 270, and the route $R_0$, $R_1$, and $R_2$ can be connected into one navigation route though the processing by the route combining section 270.

The function of the route combining section 270 is favorable to the user of the navigation apparatus 2. For example, in a case of running from Yokohama to Nagano, main intersections in Yokohama and Nagano are respectively set as the start point S and end point E for the server 1, and thereby a route $R_1$ can be obtained, wherein the route is normally a main road, which is apt to be affected by a traffic congestion and the like. Accordingly, it makes sense to search the route $R_1$ by the server 1.

On the other hand, the route $R_0$ from the current position O to the start point S and the route $R_2$ from the end point E to the destination D may be respectively a narrow street in an urban area off the main road and a mountain road in the countryside. In such a case, neither the map database 111 on the server 1 nor the map database 213 on the navigation apparatus 2 often reflects the actual road status enough. Therefore, a vehicle often runs on, for example, a road leading to a main intersection in Yokohama and a road from a main intersection in Nagano to the final destination, wherein such roads are not included in a map and are off the navigation route. Further, in such road circumstances, the navigation apparatus 2 cannot correctly reconstruct a route transmitted from the server 1.

That is, it makes little sense to search a navigation route running through from the current position O to the final destination D by the server 1, and as in the present embodiment, it is more reasonable to search the routes $R_0$ and $R_2$ by the navigation apparatus 2. Further, in the present embodiment, as the roads $R_0$, $R_1$, and $R_2$ are combined into one navigation route, the user does not have any inconvenience. Consequently, the route guidance system 7 in the present embodiment can provide a user with a stable navigation route.

Next, a modified example of the present embodiment in accordance with the invention will be described below, referring to FIGS. 10 to 14.

First Modified Example of the Present Embodiment

Figure 10:
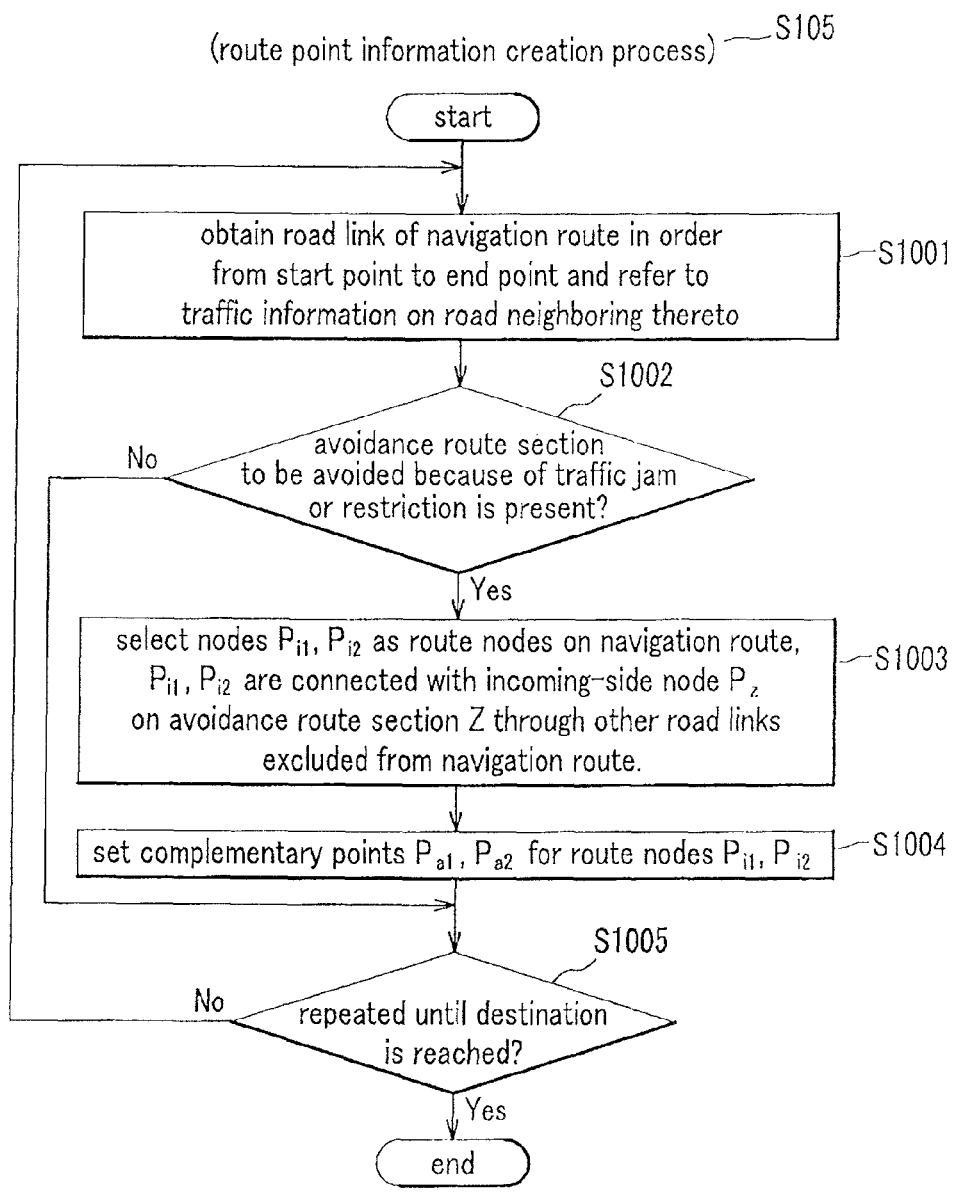
FIG. 10 is a diagram showing a first modified example of a processing flow of route point information creation processing on the server in the embodiment in accordance with the invention.
Figure 11:
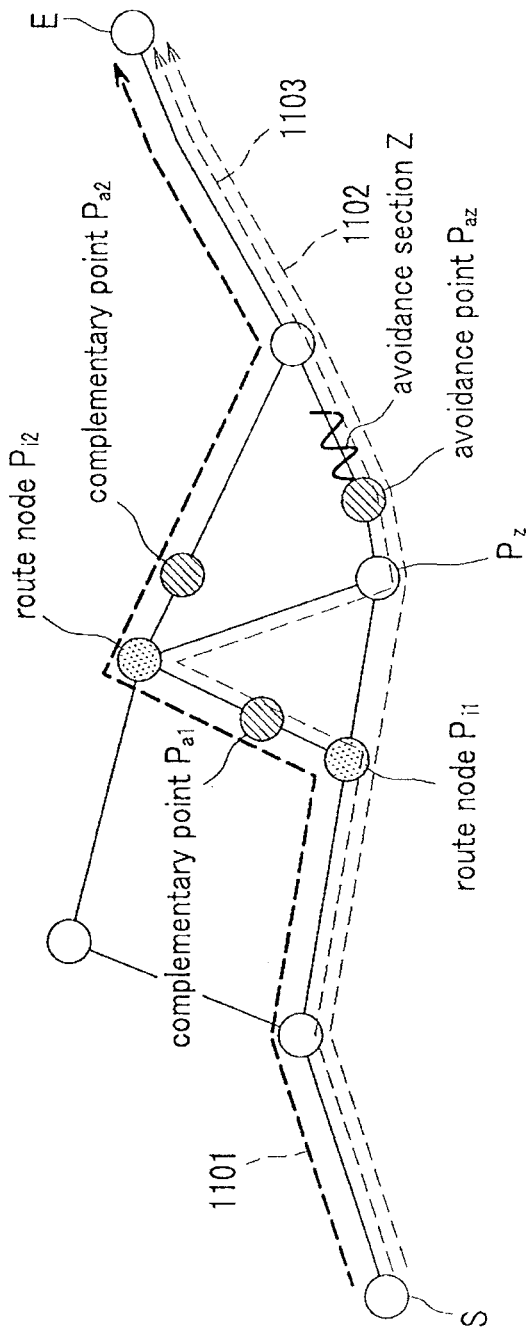
FIG. 11 is a diagram for illustration of a method of selecting route points in a setting process of route point information in the first modified example of the processing flow of route point information creation processing on the server in the embodiment in accordance with the invention.

FIG. 10 is a diagram showing a first modified example of a processing flow of route point information creation processing on the server 1 in the present embodiment in accordance with the invention. FIG. 11 is a diagram for illustrating a method of selecting route points in setting processing of route point information related to the first modified example.

In FIG. 11, the navigation route 1101 shown by thick broken lines is a navigation route from the start point S to the end point E searched by the navigation route searching section 130 of the server 1. Further, the routes 1102 and 1103 shown by thin broken lines are the second and third routes respectively running from the start point S to the end point E. The nodes $P_{i1}$ and $P_{i2}$ are route nodes of the navigation route 1101, and the points $P_{a1}$ and $P_{a2}$ are complementary points to respectively complement the nodes $P_{i1}$ and $P_{i2}$.

Further, when the navigation apparatus 2 reconstructs the route information on the navigation route, the route section Z is a route section that is difficult to drive through or it takes an abnormally long time to drive through due to a traffic congestion or traffic restriction on the way, and represents an avoidance section that a user ought to avoid passing anyway. Still further, $P_Z$ represents a node at an intersection present on the entrance side of the route section Z (hereinafter, referred to as the avoidance section Z).

As shown in FIG. 10, the control section 10 of the server 1 obtains road links sequentially from the start point S to the end point E on the navigation route 1101, and refers to the traffic status of a road neighboring thereto (step S1001). Incidentally, it is assumed that the server 1 obtains in advance data of traffic status, such as traffic congestion information or traffic restriction, from the traffic information center 51 or the like, and stores the data into the external information database 112 or the like.

Then, the control section 10 determines whether or not an avoidance section Z to be avoided, because of a traffic congestion, traffic restriction, or the like, is present on a road neighboring thereto (step S1002), and if an avoidance section Z is present (step S1002→Yes), the control section 10 selects the nodes $P_{i1}$, connected to the entrance-side node $P_Z$ of the avoidance section Z, and $P_{i2}$ on the navigation route 1101 as route nodes, (step S1003). Further, according to the setting flow of complementary points described above referring to FIG. 5, the control section 10 sets complementary points $P_{a1}$ and $P_{a2}$ that respectively complement the route nodes $P_{i1}$ and $P_{i2}$ (step S1004). If an avoidance section Z is not present (step S1002→No), the control section 10 omits execution of step S1003 and S1004.

Then, the control section 10 determines whether or not it has repeated the determination on the presence of an avoidance section Z up to the destination (end point E) (step S1005), and if not having repeated the determination up to the destination (step S1005→No), the control section 10 returns to step S1001 and reiteratively performs the processing steps in and after step S1001. If the control section 10 has repeated the determination up to the destination (step S1005→Yes), the control section 10 terminates this route point information creation process.

In such a manner, it is possible to select the route nodes $P_{i1}$ and $P_{i2}$ that allow avoiding the avoidance section Z, and set the complementary points $P_{a1}$ and $P_{a2}$ to the route nodes $P_{i1}$ and $P_{i2}$. Thus, when having received such route point information, the route guidance control section 20 of the navigation apparatus 2 does not reconstruct a route, such as the route 1102 or 1103, that passes through an avoidance section Z, thereby correctly reconstructing the navigation route 1101 searched by the server 1.

Second Modified Example of the Present Embodiment

With the foregoing modified example in the present embodiment, route nodes were set such as to avoid the avoidance section Z. However, it is also possible to set the entrance-side node $P_Z$ of the avoidance section Z as an avoidance node and set an avoidance point $P_{az}$ in the vicinity of the avoidance section Z, and make the route point information described referring to FIG. 6 include the avoidance node $P_z$ and avoidance point $P_{az}$ thus providing the route point information to the navigation apparatus 2.

In this case, in the route point identification processing by the navigation apparatus 2 (refer to FIG. 7), the route guidance control section 20 detects the road link including the avoidance section Z (road link in the road data of the map database 213), similarly to the identification processing of route links. Then, in the subsequently performed route searching process, the route guidance control section 20 sets the cost by the road link corresponding to the avoidance section Z to the maximum so as to avoid the road link that includes the above-detected avoidance section Z, and then searches a route from the start point S to the end point E. In such a manner, the avoidance section Z is excluded from the navigation route, and thereby the navigation route 1101 avoiding the avoidance section Z can be reconstructed.

Third Modified Example of the Present Embodiment

Figure 12:
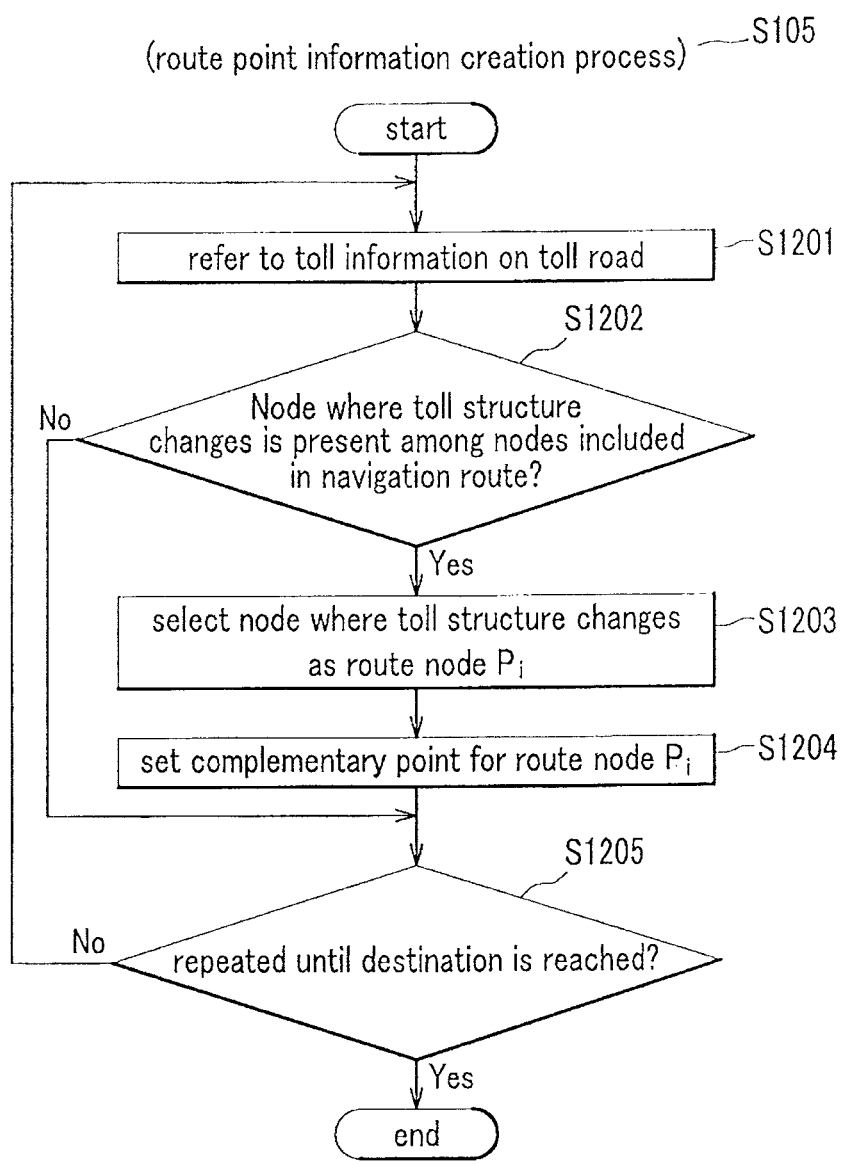
FIG. 12 is a diagram showing a third modified example of a processing flow of creation processing of route point information on the server in the embodiment in accordance with the invention.
Figure 13:
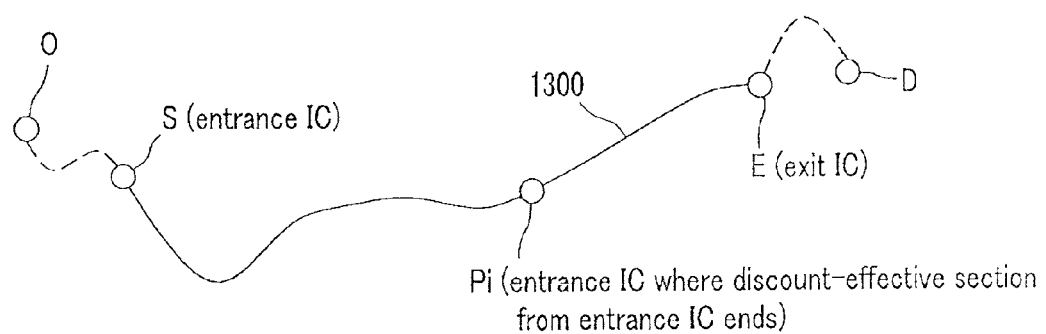
FIG. 13 is a diagram for illustration of a method of selecting route points in the setting process of route point information in the third modified example of the processing flow of creation processing of route point information on the server in the embodiment in accordance with the invention.

FIG. 12 is a diagram showing a third modified example of a processing flow of creation processing of route point information on the server 1 in the present embodiment in accordance with the invention. FIG. 13 is a diagram for illustration of a method of selecting route points in the setting process of route point information related to the third modified example.

In FIG. 13, the point O represents the current position of the vehicle; the point D represents the final destination; and points S and E respectively represent the start point S and end point E at the time of requesting the server 1 to search a route. Herein, the point S and point E are assumed to be respectively the entrance IC (interchange) and exit IC of a highway. Further, it is assumed that there is a point $P_i$, on the highway, where the toll structure changes, and a significant discounted toll is applied from the entrance IC up to the IC at the point Pi.

In such a case, the user tries to use the highway from the entrance IC up to the IC at the point $P_i$, and exit the highway from the IC at the point $P_i$. As a result, in the present example in the present embodiment, if such a node related with toll discount is present, this node is unexceptionally set as a route point. Thus, the navigation apparatus 2 can reconstruct a navigation route running through the node related with toll discount without fail. Accordingly, when the vehicle reaches the IC at the point $P_i$, the user can get off from the IC onto an open road.

A process of creating route point information in a case of setting a node related to toll discount will be described below, referring to FIG. 12.

Referring to toll information on a toll road related with a searched navigation route (in FIG. 13, the part, shown by a solid curve from the point S to the point E, of the navigation route 1300) (step S1201), the control section 10 of the server 1 determines whether or not a node is present where the toll structure changes among the nodes included in the navigation route 1300 (step S1202). If a node where the toll structure changes is present (step S1202→Yes), the node is selected as a route node $P_i$ (step S1203). Incidentally, it is assumed that the control section 10 has obtained the toll information on the toll road in advance from the POI information center 52 or the like, and has stored the toll information into the external information database 112 or the like.

Then, the control section 10 sets a complementary point $P_a$ (not shown) to the route node $P_i$, according to the setting flow of complementary points described with reference to FIG. 5 (step S1204). Incidentally, if a node where the toll structure changes is not present (step 1202→No), the control section 10 omits execution of steps S1203 and S1204.

Then, the control section 10 determines whether or not it has repeated the processing described above up to the destination (end point E) (step S1205), and if not having repeated the processing up to the destination (step S1205→No), the control section 10 returns to step S1201 and repeatedly performs the processing in step S1201 and after. If the control section 10 has repeated the processing up to the destination (step S1205→Yes), the control section 10 terminates this route point information creation processing.

In the case described above, the control section 10 may perform such control that the attribute information on nodes in the route point information transmitted from the server 1 to the navigation apparatus 2 includes information on, for example, the toll discount rate and applied scope, and the toll discount rate or the like is displayed on the display section 25.

Fourth Modified Example of the Present Embodiment

In the foregoing embodiment in accordance with the invention, as shown in FIG. 3, in the process of creating route point information by the server 1, route point nodes are selected in the descending order of the number of road links branched from the node, however, the route point nodes may be selected according to a different method.

For example, in the process of creating route point information, the branch distribution rate of the traffic amount may be used instead of the number of branches. Herein, the branch distribution rate of the traffic amount refers to a value that becomes larger as the incoming traffic into the route point node run into the outgoing links from the route point node so that the incoming traffic amount coming into the route point node is distributed into the respective outgoing links from the route point node in accordance with a ratio of the average traffic amounts of the respective outgoing links dispersed traffic amounts which are averaged to a greater extent.

Figure 14:
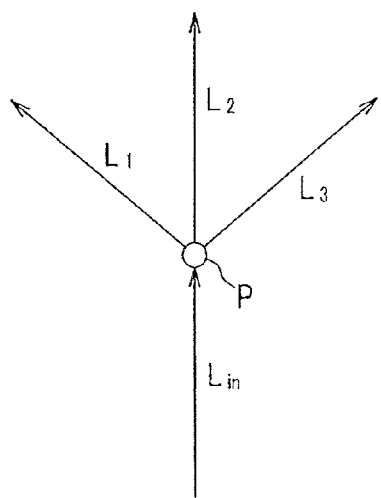
FIG. 14 is a diagram for illustration of the branch distribution rate of a traffic amount in the creation processing of route point information in the present embodiment.

The branch distribution rate of a traffic amount will be described below, referring to FIG. 14. FIG. 14 is a diagram for illustration of the branch distribution rate of a traffic amount in the creation processing of route point information in the present embodiment. In FIG. 14, the hollowed circle P represents a node; the arrow $L_{in}$ represents an incoming link; and three arrows $L_1$, $L_2$, and $L_3$ represent outgoing links.

For example, it will be assumed that the traffic amount of the incoming link $L_{in}$ to a certain node P in a certain time zone is 1000, and the traffic amounts of the outgoing links $L_1$, $L_2$, and $L_3$ are respectively 200, 300, and 500. Herein, the ratios of the traffic amounts running out into the respective outgoing links $L_1$, $L_2$, and $L_3$ are 200÷1000=0.2 for $L_1$, 300÷1000=0.3 for $L_2$, and 500÷1000=0.5 for $L_3$. The ratio values with respect to the respective directions normalized by the maximum value of 0.5 are 0.4 for direction $L_1$, 0.6 for direction $L_2$, and 1 for direction $L_3$. The average of these values excluding the value for direction $L_3$ is (0.4+0.6)÷2=0.5. In the present embodiment, this value will be referred to as the branch distribution rate at the node P for the incoming link $L_{in}$ in the current time zone.

The reason the value obtained in such a manner is referred to as the branch distribution rate is that the value becomes large when a traffic amount is averagely distributed into the respective outgoing links, and becomes small when the traffic amount concentrates to a particular outgoing link. Incidentally, in the example shown in FIG. 5, if the respective traffic amounts of the outgoing links $L_1$, $L_2$, and $L_3$ are all the same, all the respective traffic amounts of the outgoing links $L_1$, $L_2$, and $L_3$ normalized by the maximum amount thereof are 1, and accordingly the average of two values excluding the maximum value is also 1. On the other hand, if an incoming traffic amount concentrates on a certain one outgoing link for running out of the route point node, the traffic amounts of both the other two outgoing links become zero, and accordingly, both values normalized by the maximum value thereof become zero, and the average value also becomes zero. In short, when a traffic amount equally is distributed into the outgoing links $L_1$, $L_2$, and $L_3$, the branch distribution rate becomes a maximum value of 1, and when a traffic amount concentrates on any one of the outgoing links $L_1$, $L_2$, and $L_3$, the branch distribution rate becomes a minimum value of zero.

Incidentally, such a branch distribution rate is determined on each incoming link at each node by calculating the branch distribution rate for each unit time zone being a division of one-day/24-hours divided by a unit time. Incidentally, instead of a branch distribution rate for each incoming link at each node, a branch distribution rate independent from individual incoming links may be determined for each node by calculating the average value of branch distribution rates calculated for the individual incoming links at the node and setting the average value as the branch distribution rate at the node.

Incidentally, for the present modified example in the present embodiment, it is assumed that the branch distribution rates are stored in advance in the map database 111 as node information as well as the number of branches. However, the control section 10 may obtain branch distribution rates from the external information center 5 and store the coefficients into the map database 111. Further, a branch distribution rate calculation section for calculation of branch distribution rates may be provided as an element for a structure of the server 1 so as to calculate branch distribution rates, based on traffic information (including traffic amounts) obtained from the external information center 5. Still further, in addition to route request information, the server 1 may receive data of running results of the vehicle from the navigation apparatus 2 and accumulate the data of running results, thereby calculating branch distribution rates.

Further, as another method of selecting route points, when a drop-in point, such as a facility (a convenience store, restaurant, resting spot such as a service area/parking area) is designated as a search condition, a node, from which a road link having the drop-in present thereon is branched, may be selected with a priority, as a route point node. In this case, because the drop-in point is not necessarily an intersection node, the position of a facility including the drop-in point may be set as a complementary point of the route node.

Other Modified Examples in the Present Embodiment

Further, although, in the foregoing embodiment in accordance with the invention, the navigation apparatus 2 requests the server 1 to transmit route information in step S203 in FIG. 2, however, the navigation apparatus 2 requests not only the route information but also traffic information in a modified example in accordance with the present embodiment. In this case, when the server 1 has failed to search a guided road, in other words, found no navigation route (step S103→No), the server 1 transmits information indicating "no route point information" to the navigation apparatus 2 (step S104) and transmits traffic information such as traffic congestion information or the like on the related areas. Thereby, using this traffic information, the navigation apparatus 2 can search a route to the destination by the function of the route searching section 260 of the navigation apparatus 2 itself.

Still further, although, in the foregoing embodiment in accordance with the invention, the route request information transmitted from the navigation apparatus 2 to the server 1 does not include identification information on the map data format of the map database 213 mounted on the navigation apparatus 2 itself and the version information, however, the route request information may include these pieces of information.

In this case, the server 1 determines the identification information on the map data format and the version information, and if the map database 111 includes map data in the same format as the determined map data format and in the same version as the determined version, the server 1, using the map data in the same format and in the same version, performs route searching requested by the navigation apparatus 2 and transmits route point information as a result of the searching to the navigation apparatus 2.

In this case, the navigation apparatus 2 obtains route point information created based on the map data in the same format and in the same version as the map database 213 of its own, and accordingly, can reconstruct a route almost free from occurrence of errors, from the route point information.

In accordance with the invention, a navigation apparatus is enabled to reconstruct route information expressed on the basis of position-coordinates transmitted from an information center (a route guidance server) into a route expressed on the basis of link-numbers or node-numbers which are based on the map data of the navigation apparatus itself without an error even when the map data of the information center and the map data of the navigation apparatus are different from each other.

What is claimed is:

1. A route guidance server providing a navigation apparatus with route information on a navigation route,
   the route guidance server comprising:
   a map data base inclusive of map data
   a navigation route searching section for searching the navigation route from a start point to an end point with reference to the map data, wherein there are nodes on the navigation route;
   a route point information creation section that preferentially selects route notes from among the nodes on the navigation route from the start point to the end point and sets a complementary point for each of the selected route nodes with reference to the map data, wherein each of the selected route nodes is connected with a larger number of branches than other unselected nodes, the complementary point is on one of road links constituting the navigation route, the one of the road links has an end point at each of the selected route nodes, each of the complementary points is more than a predetermined distance or the predetermined distance apart from the end point and is not closer to another road in a vicinity of the selected route nodes than the one of the road links; and
   a route information transmission section that transmits to the navigation apparatus the route information inclusive of coordinate information on the each of the selected route nodes and coordinate information on the complementary point set for the each of the selected route nodes.

2. The route guidance server according to claim 1, further holding traffic amount data for traffic amount on each road link, wherein, in selecting the route nodes, the route point information creation section refers to the map data and the traffic amount data, and preferentially selects from the nodes included in the navigation route from the start point to the end point, nodes of which a branch distribution rate is larger than other nodes, the branch distribution route representing a degree of distribution of a traffic amount from an incoming link to the node being distributed into outgoing links 3. The route guidance server according to claim 1, further holding traffic status data of each road link which indicates a degree of difficulty in passing through the each road link due to a traffic congestion or traffic restriction, wherein, in selecting the route nodes, the route point information creation section refers to the map data and the traffic status data, searches road links which are in a vicinity of the navigation route from the start point to the end point for a passing avoidance road link, the passing avoidance road link, whose degree of the difficulty in passing through is high and which is to be avoided to pass through, and selects as the route node a node being on the route and connected through a road link excluded from the route with a node on an incoming side of the passing avoidance road link, if the passing avoidance link is present in the vicinity.

4. The route guidance server according to claim 1, further holding traffic status data of each road link which indicates a degree of difficulty in passing through the each road link due to a traffic congestion and traffic restriction, wherein, in selecting the route nodes, the route point information creation section refers to the map data and the traffic status data, searches road links which are on the route from the start point to the end point or in a surrounding of the navigation route for a passing avoidance road link, the passing avoidance road link, whose degree of the difficulty in passing through is high and which is to be avoided to pass through, and transmits information on position coordinates and attributes of the passing avoidance road link in addition to the route information to the navigation apparatus if the passing avoidance road link is present on the navigation route.

5. The route guidance server according to claim 1, further holding toll information on toll for a toll road, wherein, in selecting the route nodes, the route point information creation section refers to the toll information, and selects, from the nodes included in the navigation route from the start point to the end point, a node at which a toll calculation system of the toll road changes as one of the route nodes.

6. The route guidance server according to claim 1, wherein the complementary point is a predetermined distance or more than the predetermined distance apart linearly from the other road in the vicinity of the each of the selected route nodes than the one of road links.

* * * * *